United States Patent
Williams et al.

(10) Patent No.: US 6,404,773 B1
(45) Date of Patent: Jun. 11, 2002

(54) CARRYING SPEECH-BAND SIGNALS OVER A POWER LINE COMMUNICATIONS SYSTEM

(75) Inventors: Roy Leslie Williams; Robin Paul Rickard, both of Bishop's Stortford; Martin Brent Daniells, Chelmsford, all of (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/114,778

(22) Filed: Jul. 13, 1998

(30) Foreign Application Priority Data

Mar. 13, 1998 (GB) .............................................. 9805475

(51) Int. Cl.[7] .............................................. H04L 12/66
(52) U.S. Cl. .................. 370/463; 370/419; 340/310.01; 375/219
(58) Field of Search ...................... 709/208; 340/310.02, 340/310.01; 370/352, 463, 419; 379/90.01, 221.02; 375/257, 219; 385/16; 455/3.3

(56) References Cited

U.S. PATENT DOCUMENTS

| | | | | |
|---|---|---|---|---|
| 4,815,106 A | * | 3/1989 | Propp et al. ................. | 375/257 |
| 5,029,334 A | | 7/1991 | Braun et al. ................. | 370/252 |
| 5,278,862 A | | 1/1994 | Vander Mey ............... | 375/139 |
| 5,289,476 A | | 2/1994 | Jonson et al. ................ | 714/775 |
| 5,341,415 A | * | 8/1994 | Baran ..................... | 379/221.02 |
| 5,774,526 A | * | 6/1998 | Propp et al. ............. | 379/90.01 |
| 6,048,873 A | * | 7/2000 | Russell et al. .............. | 370/352 |
| 6,144,292 A | * | 11/2000 | Brown .................. | 340/310.02 |
| 6,154,488 A | * | 11/2000 | Hunt .......................... | 375/219 |
| 6,175,860 B1 | * | 1/2001 | Gaucher ..................... | 709/208 |

FOREIGN PATENT DOCUMENTS

| | | |
|---|---|---|
| WO | WO94 03002 A1 | 2/1994 |
| WO | WO 95/19070 | 7/1995 |
| WO | WO 95/29537 | 11/1995 |
| WO | WO 96/06490 | 2/1996 |
| WO | WO 97/04582 | 2/1997 |
| WO | WO 98/06188 | 2/1998 |

* cited by examiner

Primary Examiner—Hassan Kizou
Assistant Examiner—John Pezzlo
(74) Attorney, Agent, or Firm—Lee, Mann, Smith, McWilliams, Sweeney & Ohlson

(57) ABSTRACT

Speech-band signals such as voice telephony and facsimile are trasnmitted over a power line communications system. The method comprises: receiving speech-band signals at the communications station from speech-band communications equipment; digitising the speech-band signals; encoding the digitised signals into data packets; and transmitting the data packets to/from a station over a part of the line which is external to the premises, using a packet data communications protocol. Equipment can selectively route the speech-band signals via the power line or the PSTN.

17 Claims, 10 Drawing Sheets

CARRYING SPEECH-BAND SIGNALS OVER A POWER LINE COMMUNICATIONS SYSTEM

TECHNICAL FIELD

This invention relates to transmission of speech-band telecommunications signals such as voice and facsimile signals over a power line communications system.

BACKGROUND OF THE INVENTION

Voice and data transmission is conventionally conducted between subscriber terminals over a PSTN, with the local subscriber loop being provided by twisted wire pairs.

There have been a number of proposals to carry voice and data signals over the limited distances of electrical wiring within a building, and to perform meter reading and load control applications at low bit rates on an electricity distribution network external to buildings. Until recently the distribution network external to a building has not been used to carry voice or high bit rate data communications.

International Patent Applications WO 95/29537 A1 (Norweb) and WO 98/06188 A1 (Northern Telecom) describe electricity distribution networks which carry telecommunications signals. Delivering a telecommunications service in this manner is attractive as it overcomes the need for installing cabling to each subscriber, which is one of the greatest costs in providing a new telecommunications network. Existing power lines are used to carry the telecommunications signals to subscribers.

International Patent Application WO 95/29537 describes the use of existing circuit-switched telephony standards such as CT2 to carry telecommunications signals over a power line network. Standard CT2 equipment is used at subscriber terminals and the output of this equipment, which lies in the frequency band around 866MHz, is converted to a more acceptable frequency band for transmission over the power line network.

Power line transmission is one of several ways for delivering communications to subscriber premises and is therefore sensitive to competition with existing copper wires and more recent alternatives such as optical fibre/coaxial cable delivery and fixed radio access techniques. Therefore, there is a desire to provide a system that is capable of delivering an acceptable quality of service at a cost that is attractive to a subscriber.

SUMMARY OF THE INVENTION

The present invention seeks to provide an alternative way of carrying speech-band signals, such as voice signals, over a power line communications system.

A first aspect of the present invention provides a method of transmitting speech-band signals over a power line communications system comprising a power line for distributing electricity to a plurality of premises and a communication station coupled to the power line, the method comprising:
  receiving speech-band signals at the communications station from speech-band communications equipment;
  digitising the speech-band signals;
  encoding the digitised signals into data packets;
  transmitting the data packets to/from the station over a part of the line which is external to the premises, using a packet data communications protocol.

Transmitting the speech-band signals in digitised form using a packet data protocol allows the speech to be carried in a robust form over the power line. Packet length and timing of the packets can be tailored to the power line environment. It also allows a mix of speech and data from a number of different subscribers to be carried over a common channel in a packet-switched manner, thereby making much more efficient use of the available spectrum on the power line.

Transmitting the speech-band signals over the power line in the form of data packets can have an advantage that premises on the power line need not be 'conditioned.' The term conditioned means that premises are fitted with low-pass filter units to prevent noise from premises entering the power line and corrupting communications signals. Avoiding the need to condition the network significantly reduces the cost of setting up a power line communications system.

The term 'speech-band' signals is intended to cover voice telephony, facsimile and other speech-band signals that would traditionally be carried over a PSTN.

The packet data protocol is preferably a polled protocol in which communications stations on the power line are polled in turn to allow them to access the shared resource of the frequency band(s) used for communications over the power line. Other protocols can also be used, such as token-passing or CSMA. Each communications station has an address and the data packet includes an address which identifies the intended recipient station of the packet.

The speech-band signals can be encoded into a form in which they are carried over the power line or they may also be encoded into another form, such as internet protocol (IP), as well as being encoded into the packet data communications protocol that is used on the power line. This is particularly useful where the called party is a person who is using a computer terminal coupled to the internet to make a telephone call.

The power line can comprise underground or overhead lines or a combination of these.

Preferred features may be combined as appropriate, and may be combined with any of the aspects of the invention as would be apparent to a person skilled in the art.

BRIEF DESCRIPTION OF THE DRAWINGS

For a better understanding of the invention, and to show by way of example how it may be carried into effect, embodiments will now be described with reference to the accompanying drawings, in which.

DESCRIPTION OF PREFERRED EMBODIMENT

Figure 1:
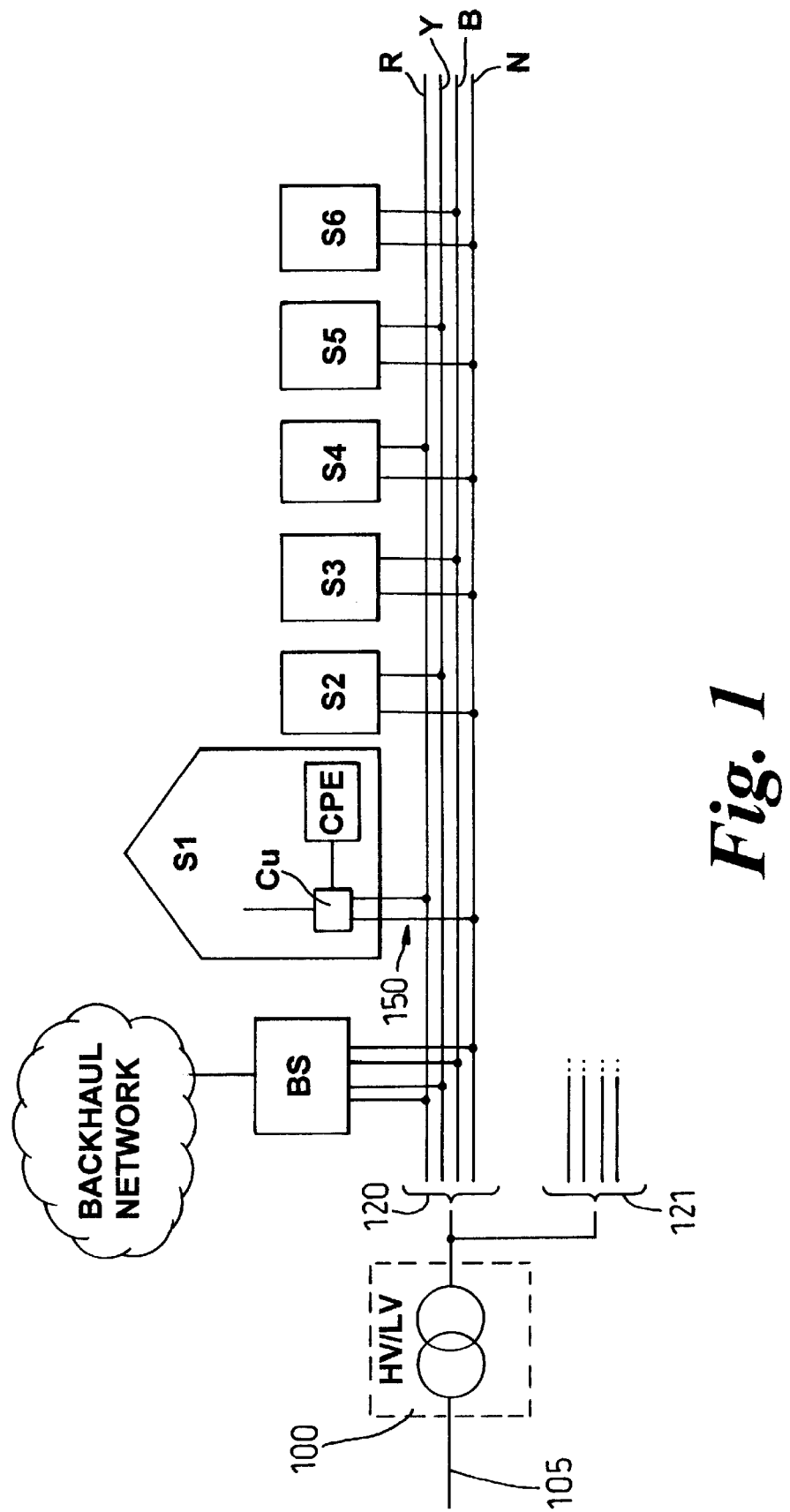
FIG. 1 shows an electricity distribution network which is adapted to carry telecommunications signals.

FIG. 1 shows an electricity distribution network which is adapted to carry telecommunications signals. Mains electricity enters the network from an 11 kV or 6.6 kV transmission line 105 and is transformed by substation 100 into a 400V supply which is delivered over distribution cable 120 to customer premises S1 to S6. A substation 100 typically has between 4 and 8 distribution cables of the kind shown as 120, 121 leading from it, each distribution cable serving a number of premises. A distribution cable can extend for several hundreds of metres. Distribution cable 120 comprises blue, red and yellow phase lines and a neutral line. Customer premises equipment CPE are typically located at houses or businesses. A full system will usually include more than the six premises shown here and will typically include a more elaborate tree-and-branch distribution network. Subscriber premises may receive a single phase electricity supply (230V) or a three-phase electricity supply (400V). Domestic subscriber premises usually receive a single phase supply and neighbouring subscriber premises are usually coupled to different phase lines. In FIG. 1 subscriber S1 is shown coupled to the red phase line, and subscriber S2 is coupled to the yellow phase line. This helps to distribute the load of the network evenly across the three phases.

A base station BS couples data communications signals onto distribution cable 120. The base station can be coupled to one or more distribution cables 120 at a point near to substation 100, as shown in FIG. 1, or it may be coupled to the bus bars at substation 100, the bus bars acting as a star point for serving all of the distribution cables. The communications signals propagate over the cable to CPEs at subscriber premises S1 to S6, with a coupling unit CU coupling the communications signals to/from the power line. Subscriber premises couple to a phase line of distribution cable 120 by a branch line 150. In the upstream direction, communications signals are transmitted from the CPEs towards the base station. Communications signals are preferably transmitted between a phase line and neutral or earth.

Communications signals can be transmitted within the frequency bands 2.2–3.5 MHz (PLT1) and 3.8–5.8 MHz (PLT2). These bands fall between the medium wave and short wave bands used for broadcast radio transmissions and avoid the radio amateur band at 3.5–3.8 MHz. There is a reduced level of background noise in these bands and the radiation of power line communications signals in this frequency band causes minimum interference with radio receiver equipment at subscriber premises. Other frequency bands in the range of, for example, 2–30 MHz can be used although it is preferred to use the lower frequencies because attenuation over the distribution cables is lower.

In addition to background noise there is impulsive noise which is caused predominantly by sparking (e.g. faulty thermostats.) This has a broad, fairly flat spectrum. The majority of noise bursts crossing the threshold are <1 ms in length. For reliable operation, it is necessary to maintain a carrier to noise ratio of at least 10 dB. Occasional noise spikes above this level can be tolerated providing that the mean time between noise events is significantly greater than the duration of a transmitted data packet. A short packet length of around 2 to 5 ms has been found to offer good performance as the short length statistically has a high probability of fitting between high-level impulsive noise bursts.

Data can be transmitted using a variety of line coding and modulation techniques. Applicant uses Frequency Shift Keying (FSK) modulation about a centre-frequency of 2.9 MHz for the frequency band PLT1. The upstream and downstream transmissions preferably share a common frequency band with the upstream and downstream transmissions occupying different times.

Figure 2:
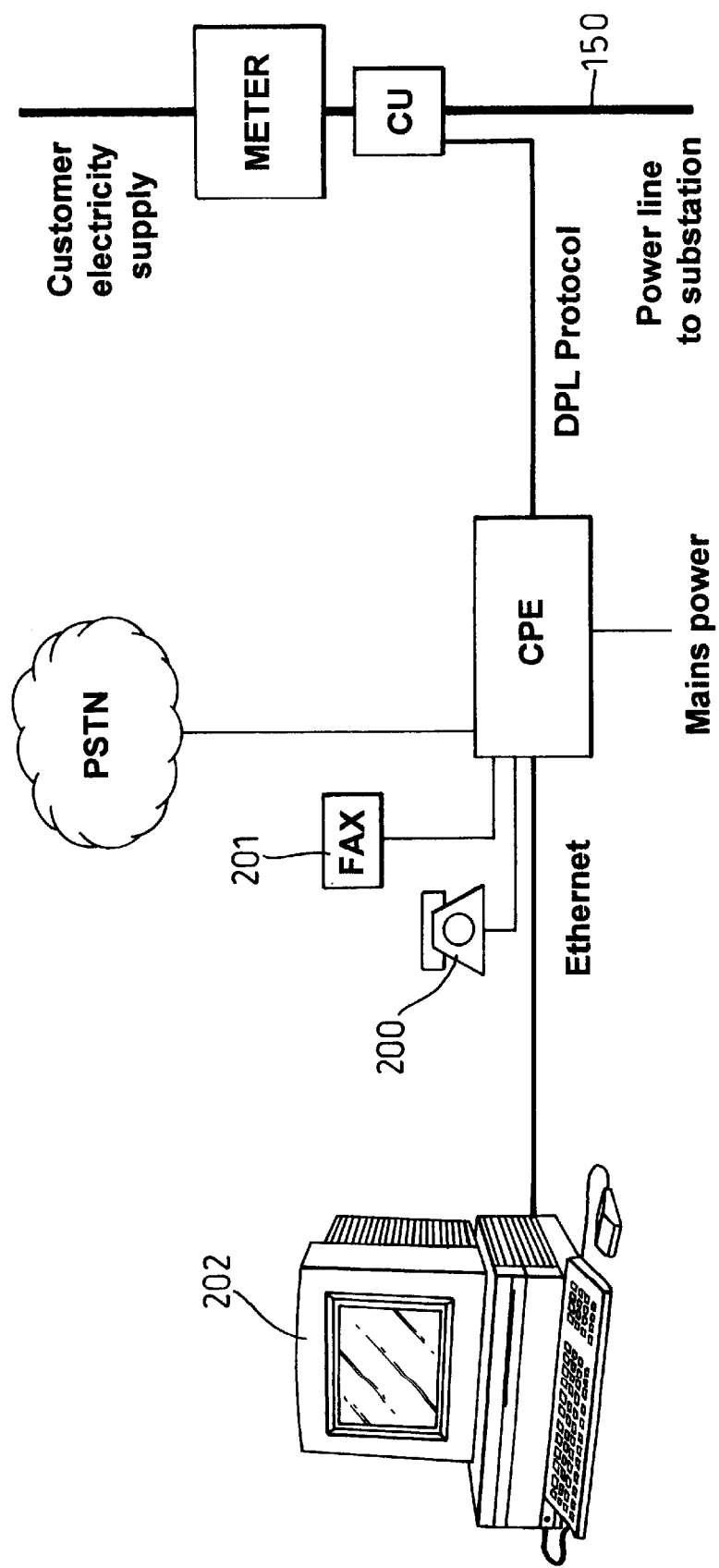
FIG. 2 shows equipment at a subscriber premises.

FIG. 2 shows the equipment at a subscriber premises. Communications signals are coupled to/from the power line 150 by a coupling unit CU. The coupling unit is typically located before the customer's electricity meter and includes a high-pass filter to pass communications signals at RF and block the flow of electricity. A customer premises equipment CPE connects to the line leading to the coupling unit so as to send and receive communications signals from the power line and also connects to communications equipment in the house including a telephone 200, facsimile machine 201 and computer terminal 202. The CPE converts data from a form in which it is carried over the power line to a form in which it can be applied to the home communications equipment. It is also possible to connect the CPE to a telephone line to provide an alternative route for voice traffic. Telephone 200 can be a conventional telephone or a telephone which is specially adapted for use with the CPE.

Figure 3:
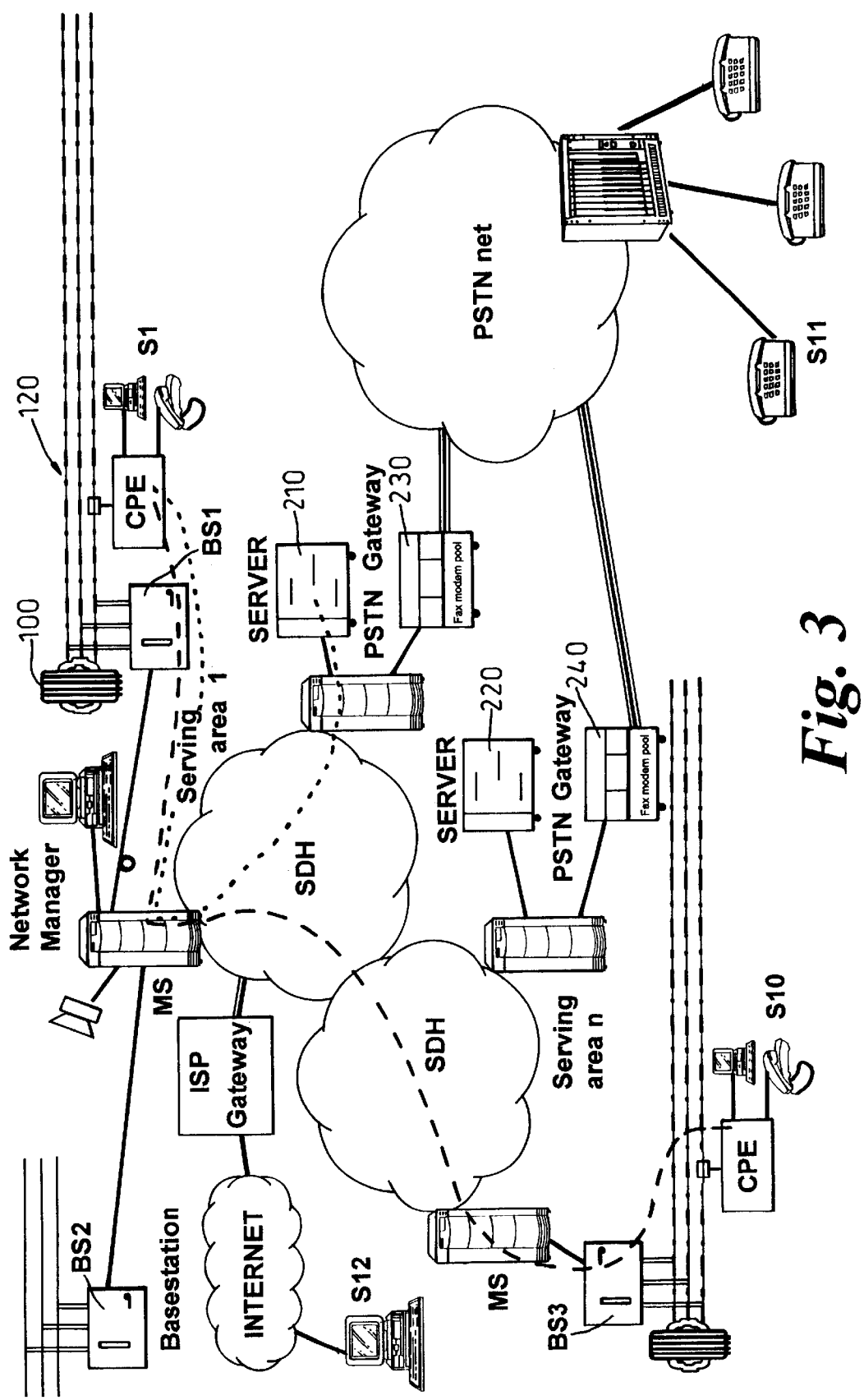
FIG. 3 shows an example communications network that couples to the power line of FIG. 1.

FIG. 3 shows an example of a telecommunications network which can connect to the electricity distribution network of FIG. 1. A number of base stations BS, each serving an electricity distribution network, are connected to a main station MS. The main station can route traffic and connects to a high-capacity transport network such as a synchronous digital hierarchy network (SDH). A number of SDH transport rings may be connected together. One or more servers 210, 220 maintain a database of details of communications subscribers in the system and respond to signalling requests from main stations. The servers consult their look-up table to identify where a subscriber is located in the system, thereby allowing main stations to route traffic to an appropriate destination.

Power line communications subscriber S1 in area 1 may wish to make a voice call to:
  (i) a subscriber on their same power line or group of lines served by base station BS1;
  (ii) a power line subscriber served by a different base station, BS2;
  (iii) a remote subscriber S10 served by base station BS3, on a different electricity company's distribution network;
  (iv) a subscriber S11 on the PSTN;
  (v) a person S12 using an IP based network (INTERNET) who is using voice over internet software on their computer, or
  (vi) some other form of subscriber, such as a mobile user.

A gateway G/WAY provides an interface between the backhaul network and the PSTN to allow subscribers on the power line network to communicate with subscribers on PSTN. The gateway performs the following functions:
  terminates a call in the speech by data packet format used on the backhaul network and initiates a call in a conventional analogue or TDM format;
  converts signalling data between the format used on the backhaul network and IN, No. 7, ISDN or other standard PSTN format;
  processes fax calls to allow highest QoS mode;
  in conjunction with servers 210, 220, allows incoming PSTN calls to be routed to power line subscribers.

Figure 4:
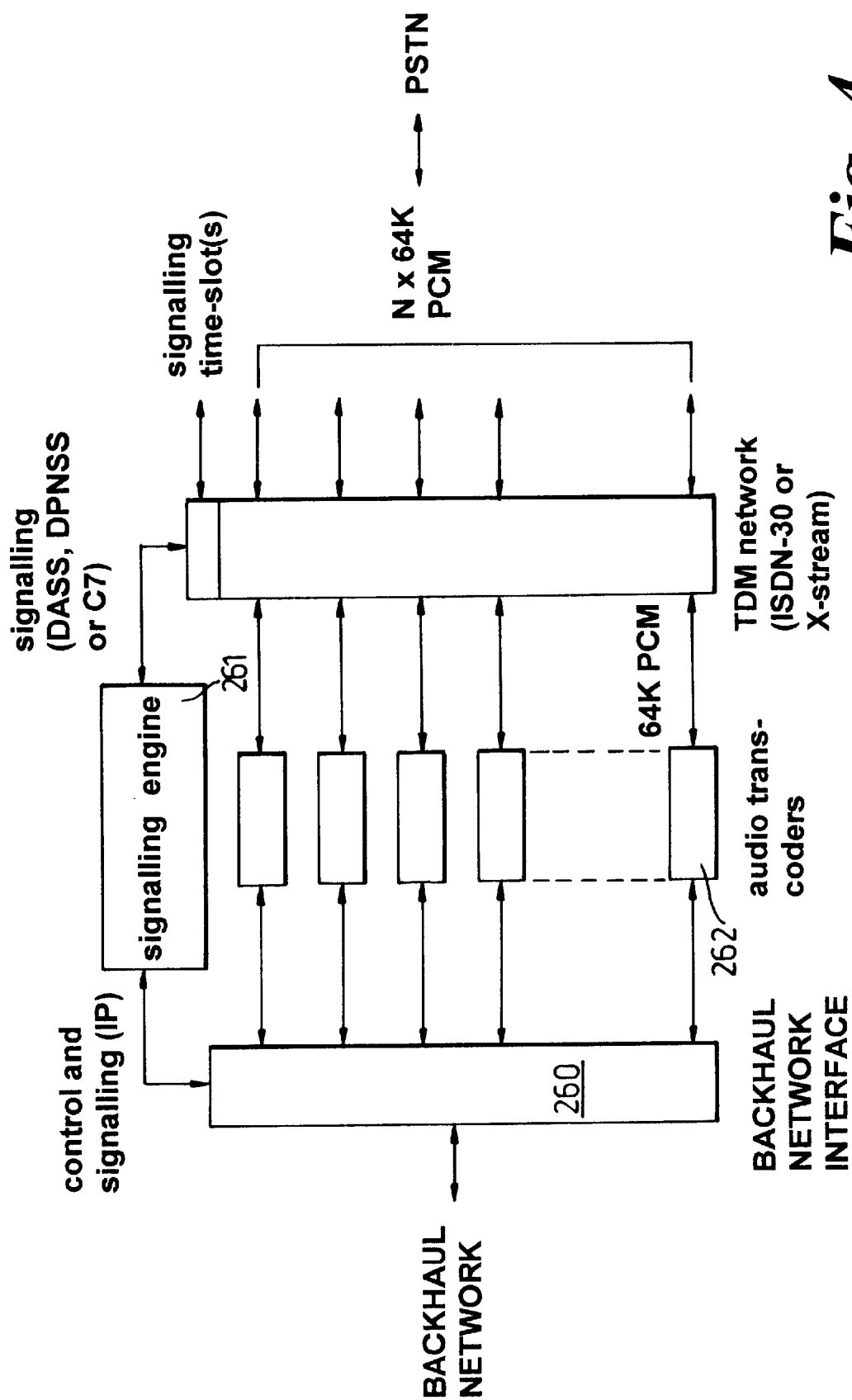
FIG. 4 shows a PSTN gateway for use in the network of FIG. 3.

A gateway architecture is shown in FIG. 4. Control and signalling information is converted between the format used on the backhaul network and the format used on PSTN by a signalling engine 261. Audio transcoders 262 convert audio data between the coding formats and rates used on the two networks.

The backhaul network is also connected to one or more Internet service Providers (ISP) via an ISP gateway (ISP G/WAY) for transmitting/receiving data packets in IP format over the Internet.

Figure 5:
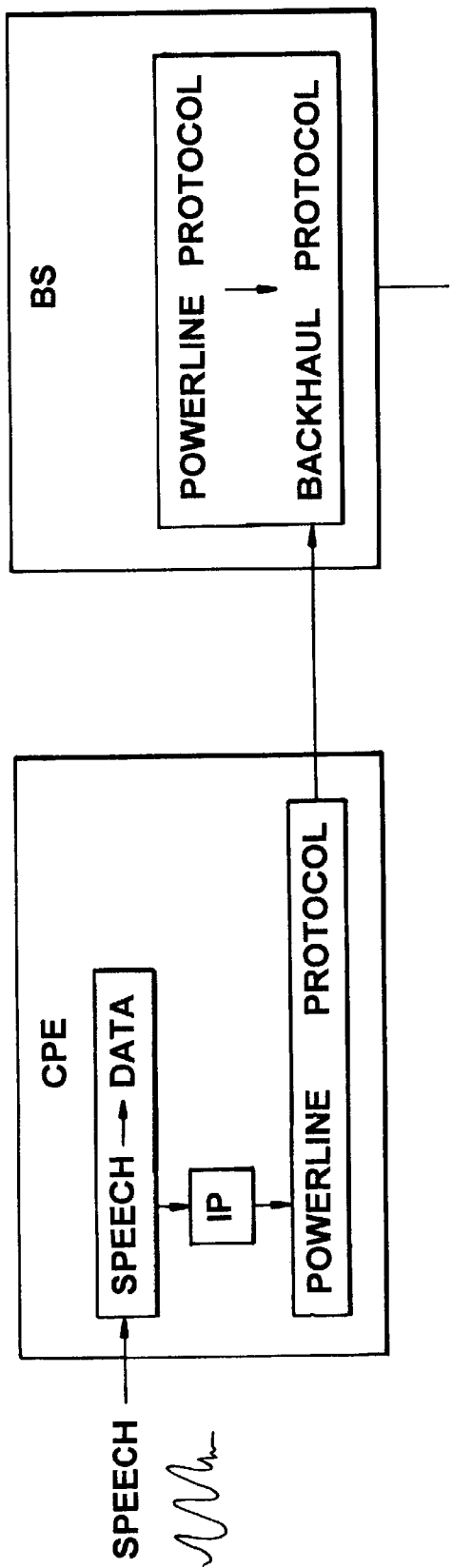
FIG. 5 shows the protocols used on the communications network.

FIG. 5 shows one example of how speech-band signals can be carried over the power line communications system. At the CPE speech is digitised to form digital data, packetised and transmitted over the power line according to a packet data protocol which is suited to the power line environment, and then, at the base station, converted into a form for transmission over the backhaul transport network.

In addition, at the CPE, the digitised speech may also be encoded according to an internet protocol (IP).

Figure 6:
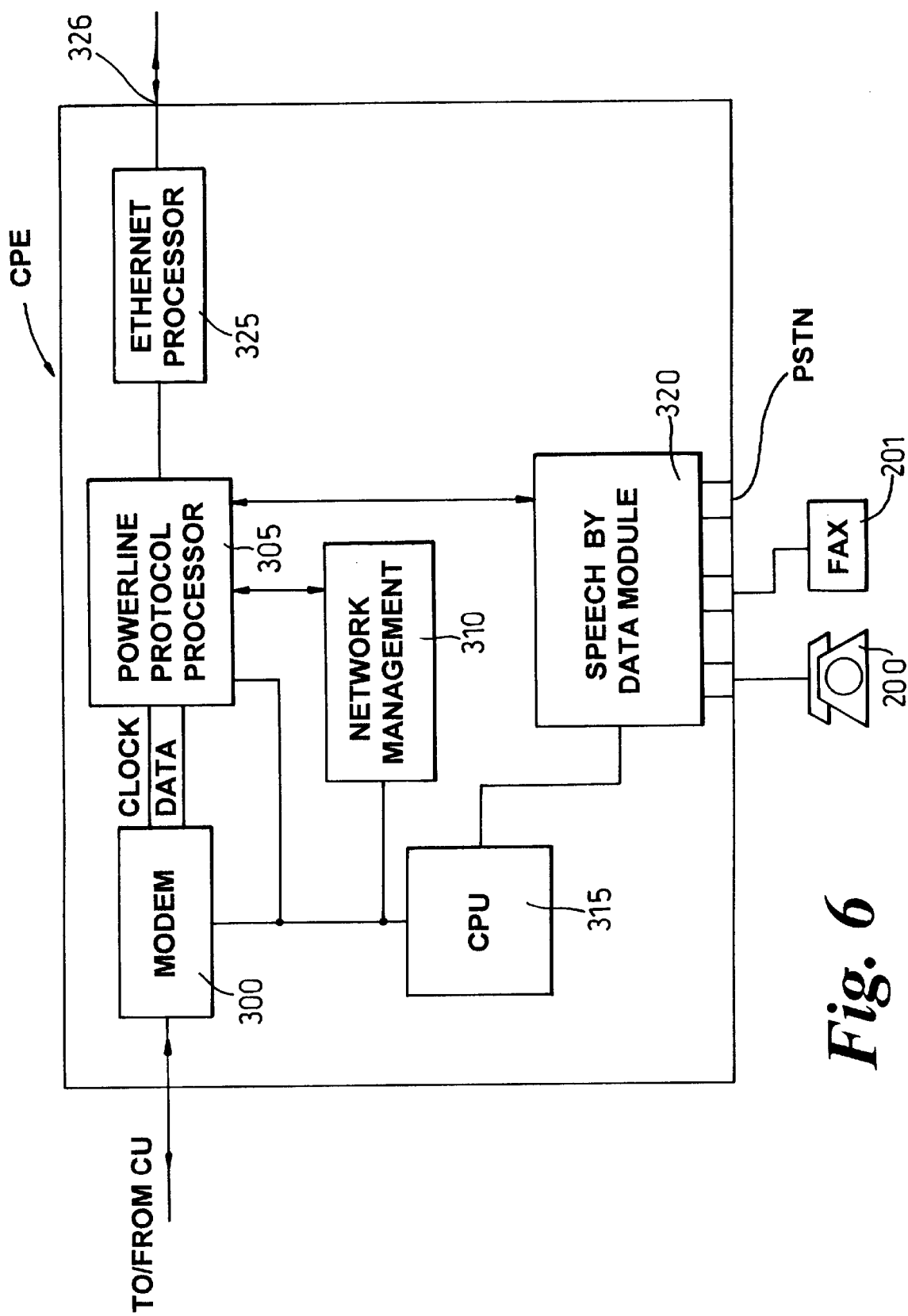
FIG. 6 shows customer premises equipment CPE.

FIG. 6 is a functional block diagram of the CPE. Communications signals, in a packet data format, are transmitted/received by modem 300. The modem converts the signals between radio frequency (typically 2–5 MHz) and base band. The modem also amplifies and detects the signals. The output of the modem is fed to a power line protocol processor 305 which assembles/dissassembles data packets and also manages transmission of those packets across the power line in response to polling commands from the base station BS.

A network management unit 310 receives network management messages from the power line network for controlling operation of the CPE. The unit may receive software updates over the communications network.

A central processor unit CPU 315 controls operation of the unit and may be a 80386 or similar processor. Speech by data module 320 connects to the powerline protocol processor 305 and CPU and also connects to external speech-band equipment including telephone 200, fax machine 201 and an external telephone line PSTN. While only one of each type of equipment is shown, there may be several. The CPE has suitable ports, such as RJ45 connectors, to allow connections to the telephone, fax and PSTN line.

The speech by data module performs the tasks of:

interfacing to the external equipment and providing the features that a telephone and fax machine would normally expect, such as ringing tone when there is an incoming call, dial tone when the receiver is lifted, and a power supply;

signalling conversion between conventional telephone signalling (DTMF) and a digital form which can be conveyed over the power line data packets;

coding/decoding of speech signals, including D/A, A/D conversion and any other digital coding that is required.

The signalling used on the power line is in the form of digital messages the conventional analogue signalling used by telephones and fax machines is not simply converted by an A-to-D converter. The speech by data module detects the analogue signalling and then selects an appropriate digital message to send over the power line. The same process is performed in reverse for an incoming signalling message, e.g. a digital message on the power line indicative of an incoming call is detected at the speech by data module and triggers the generation of a ringing tone for the telephone equipment 200.

The CPE can also receive data from data equipment via a further port 326. The data is processed by a data processor, such as an Ethernet processor 325, which converts the data that is received from port 326 into a form in which it can be processed by the power line protocol processor 305.

Figure 7:
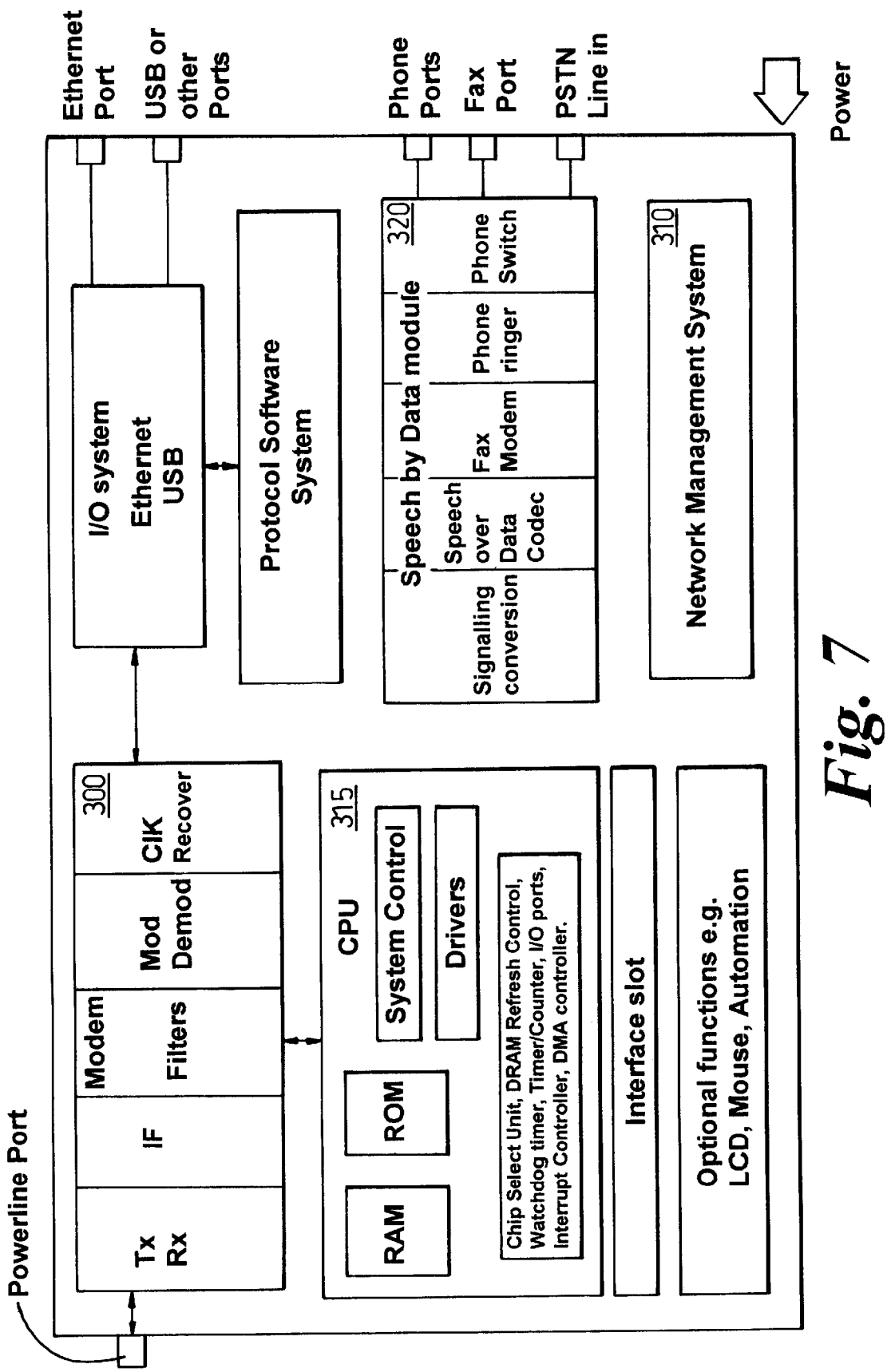
FIG. 7 shows the customer premises equipment in more detail.

FIG. 7 shows the CPE in more detail. Speech by data module 320 includes:

a signalling conversion unit, as described above;

a speech over data codec to perform A-to-D, D-to-A conversion and coding;

a fax modem;

a phone ringer;

a phone switch for routing a call via the PSTN or power line.

It is preferable to use the fax modem for fax calls as it can decode the tones received from the fax port and translate them into a digital form for putting into the power line packets, in a similar way to how the analogue telephone signalling is handled, rather than simply performing an A-to-D conversion on the fax tones. A pool of fax modems at the PSTN gateways 230, 240 in FIG. 3 perform a similar function.

Example Telephone Call

Figure 8:
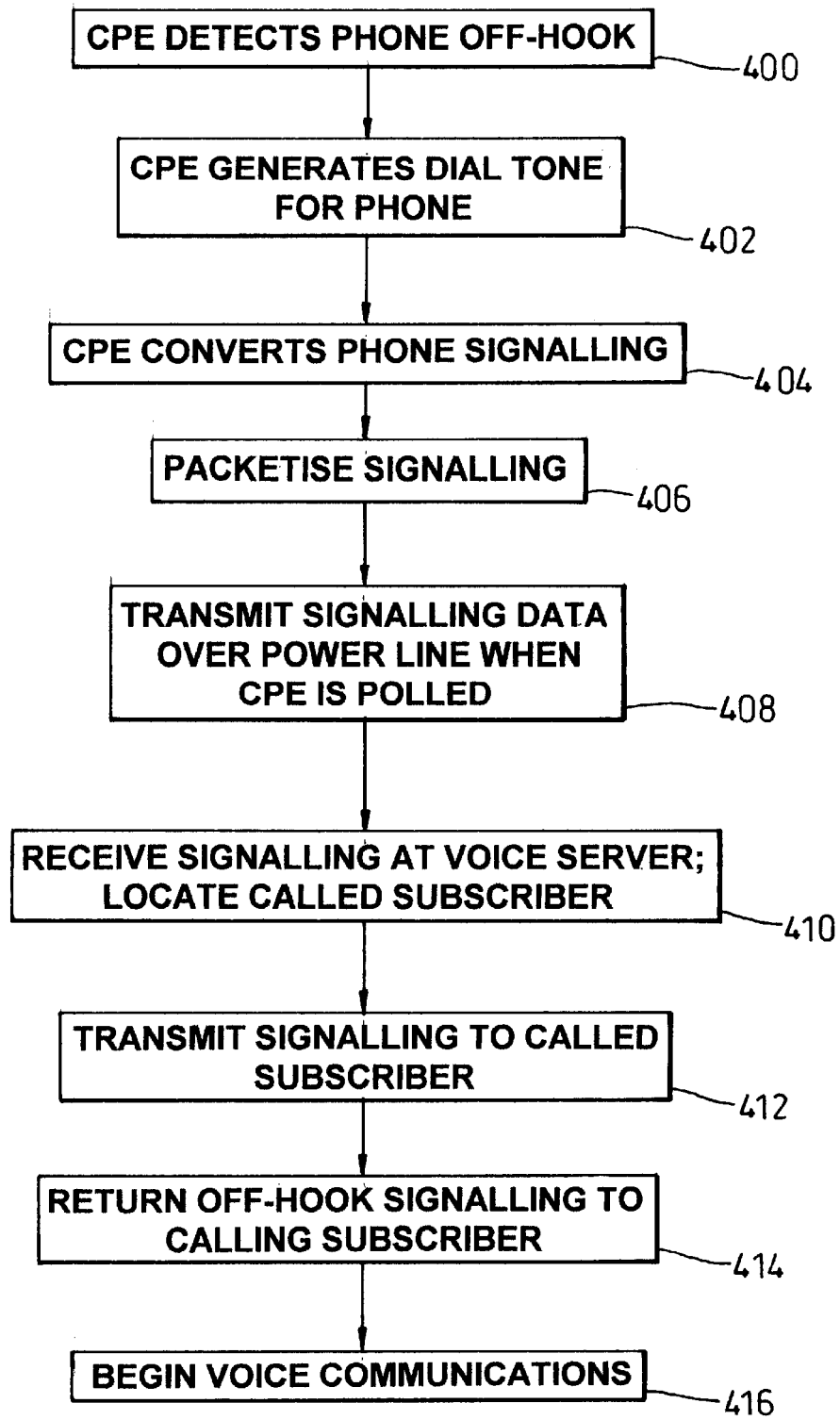
FIG. 8 is a flow chart of a voice call.

An example telephone call from a power line subscriber, will now be described with reference to the flow diagram of FIG. 8.

A subscriber goes off-hook; this condition is detected by the speech by data module of the CPE at step 400. The SBD module 320 generates dial tone for the telephone at step 402. The subscriber dials the number of the called party and this signalling is detected by the CPE and converted, at step 404, into a digital form that is compatible with the power line communications system. The signalling is packetised by the CPE at step 406 and transmitted by the CPE at step 408 when the CPE is polled by the base station. The signalling is transmitted over the power line to the serving base station, converted into a form for transmission over the backhaul network, and received by a server. The server determines the location of the subscriber and returns the routing information to the main station to allow the call to be routed. A signalling path is completed to the called subscriber, using the routing information, at step 412, and when the called party goes off-hook the off-hook condition is signalled back to the calling subscriber at step 414. The CPE ceases to generate a ringing tone and the voice path is established.

Figure 9:
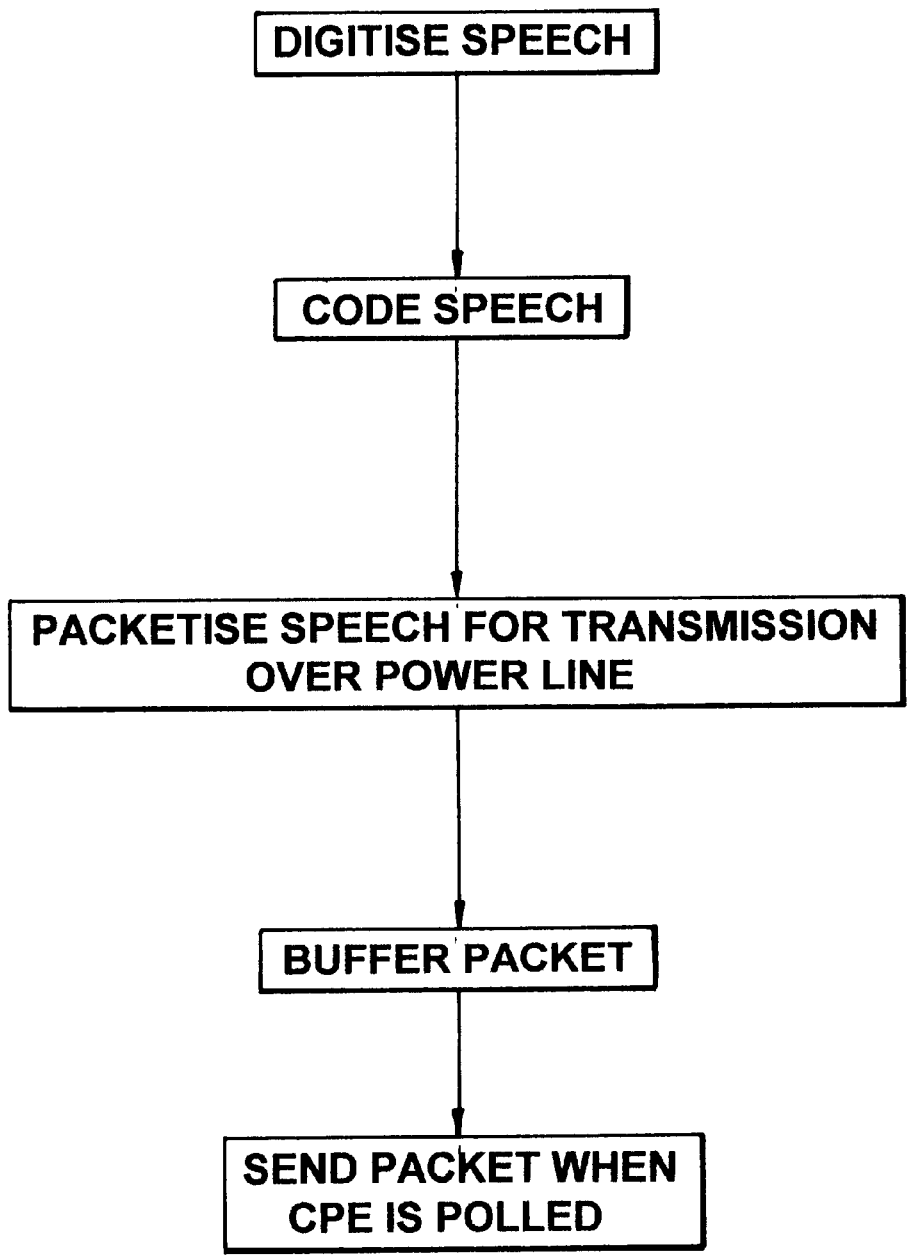
FIG. 9 is a flow chart of processing speech at the customer premises equipment.

With reference to FIG. 9, during speech-band communications speech or facsimile signals are digitised (step 430), coded (step 432), packetised into a format for transmission over the power line (step 436) and transmitted by the CPE when the CPE is polled (step 438).

Speech is carried over the power line in the form of data packets. A packet data protocol allows subscriber terminals to access the shared medium, i.e. the available power line communications frequency band, one at a time, in a packet-switched manner. It is preferred to allow the base station to control access to the medium and to poll CPEs one at a time. Communication between a given CPE and the base station therefore occurs over a series of packets which are spaced apart in time, and which are transmitted in both upstream and downstream directions. This is a half-duplex scheme. However, due to the high bit rate that is used to transmit the data packets (250 kbps, 500 kbps, 1 Mbps or higher) and the short delay between consecutive pollings of a given subscriber, a voice subscriber is given an illusion of having a full duplex communications path.

Packets include error detection coding such as a parity check to allow errors, caused during transmission over the power line, to be detected at a receiving station. It has been found that the nature of noise on a power line allows a high throughput to be achieved by retransmitting corrupted data packets (each packet containing just error detection coding) rather than including a high error-correction coding overhead in each packet and attempting to correct errors at the receiver.

In determining the length (duration) of a data packet, the following factors are important:

the effect that the duration will have on stations awaiting transmission;

the ratio between useful data content and overhead within each packet (and hence data throughput);

probability of the packet being corrupted.

A short packet length of around 2 to 5 ms has been found to offer good performance as the short length statistically has a high probability of fitting between high-level impulsive noise bursts. A further improvement can be obtained by timing the transmission of data packets to coincide with quiet periods on the power line, such as the periods between the points when the ac mains signal crosses zero volt level.

Data packets that are corrupted over the power line communications path, such as by high-level transient noise, can be retransmitted. By buffering the sent packets at the CPE for a short period after they have been sent, the CPE can respond to a request to resend a missing or corrupted packet and resend the packet from its buffer. A short buffering of received packets at the destination terminal allows time for any missing packets to be resent and arranged in their proper order before they are played out to the subscriber. Alternatively, errors may be concealed by use of error correction coding or other techniques such as: repeating the packet or part of the packet preceding the corrupted data; muting the output; or predicting the value of the missing data.

In order to minimise the end-to-end delay of transmitting speech over the power line network the power line packets can carry an amount of speech data that is longer than the packet length, e.g. 10 ms worth of speech in a 2 ms packet by using compression techniques. This compensates for the polling delay experienced by a station waiting to access the power line.

Figure 10:
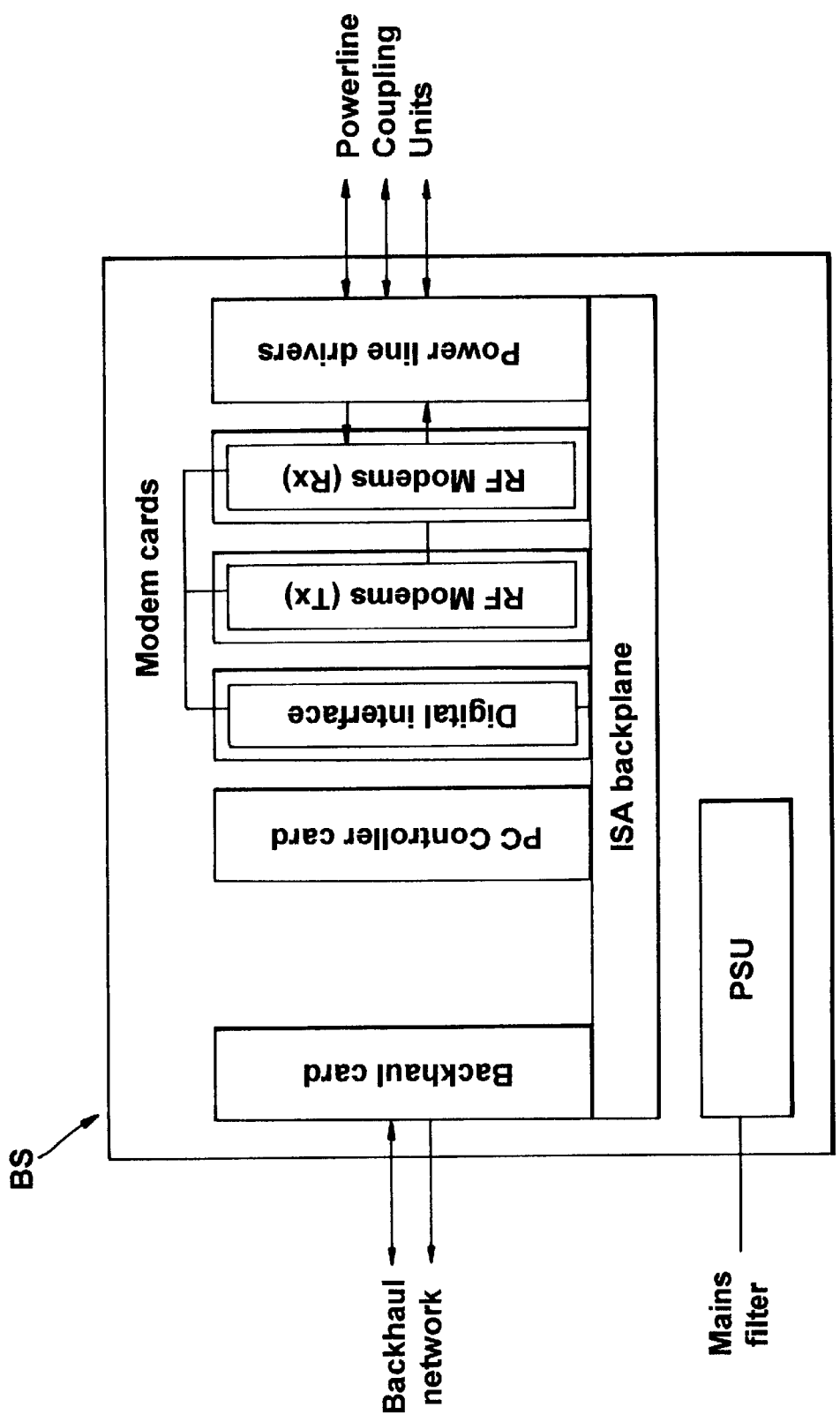
FIG. 10 shows an example base station equipment.

FIG. 10 shows an example of equipment provided at base station BS. Communications signals at RF are received from power line coupling units at the power line drivers. These signals are fed to RF modems which convert the RF signals to base band. The digital interface manages the protocol and performs conversion of the power line packets into a format for transmission over the backhaul network.

Figure 11:
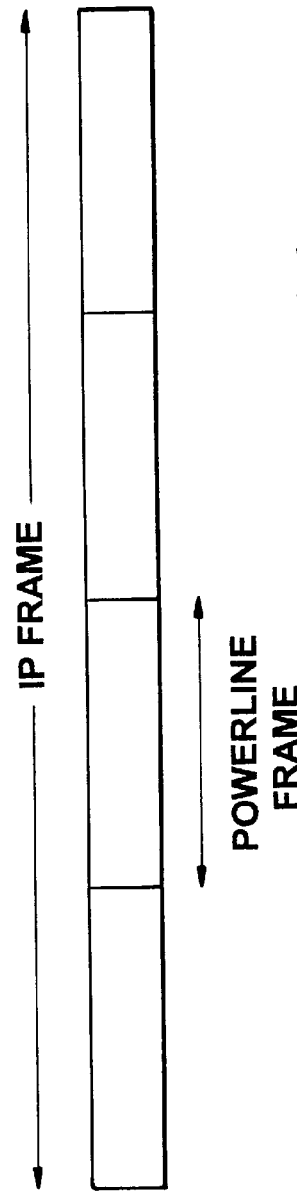
FIG. 11 shows the relationship between an IP frame and a power line protocol frame.

FIG. 11 shows one way of handling speech data that is arranged according to internet protocol (IP). IP frames are generally much longer than the packets (frames) that are used on the power line. Therefore, a single IP frame will contain a number of shorter power line protocol packets (frames). Each power line packet within an IP frame can be resent without waiting for the failure of an IP frame to be reported.

Referring again to FIG. 5, a subscriber has the option of using one of two routes for their voice/fax call:
(i) the power line communications network;
(ii) the PSTN.

The routing for a call can be selected in a number of ways. These will now be described.

The routing can be manually selected by the subscriber using a switch on the CPE.

Speech by data module 320 can respond to a predetermined signalling tone or sequence from telephone 200 to choose the subscriber's preferred call routing. For example, "#1" for power line, "#2" for PSTN. The choice is made by the subscriber himself.

Speech by data module 320 can choose a routing according to time of day, e.g. using the power line during times when that route is known to be cheaper. This information can be stored in the CPE and may be updated by data transmitted over the power line and received by network management unit 310.

Speech by data module 320 can choose a routing according to the state of the power line and PSTN communications paths, e.g. to choose the PSTN if the power line path is already in use.

What is claimed is:

1. A method of transmitting speech-band signals over a power line communications system comprising a power line for distributing electricity to a plurality of premises and a communication station coupled to the power line, the method comprising:

receiving speech-band signals at the communications station from speech-bank communications equipment;

encoding the digitised signals into data packets;

transmitting the data packets to/from the station over a part of the line which is external to the premises, using a packet data communications protocol, wherein the data packets have a length of 2–5 ms.

2. A method according to claim 1 wherein the speech-band signals are voice telephony signals.

3. A method according to claim 1 wherein the speech-band signals are facsimile signals.

4. A method according to claim 1 wherein the speech-band signals comprise speech and signalling, the method further comprising converting the signalling between an analogue form used by the communications equipment and digital messages which can be conveyed over the power line data packets.

5. A method according to claim 4 further comprising generating analogue signalling for the communications equipment connected to the station.

6. A method according to claim 5 wherein the analogue signalling comprises one or more of: dial tone, a ringing indication.

7. A method according to claim 1 wherein the data packets are carried over the power line in the frequency band greater than 1 MHz.

8. A method according to claim 1 wherein the power line is unconditioned at the premises.

9. A method according to claim 1 wherein the data packet communications protocol is polling.

10. A method according to claim 1 wherein the speech-band signals are also encoded into internet protocol (IP).

11. A method according to claim 1, further comprising receiving the data packets at a base station which is coupled to the power line, and transmitting the data packets over a backhaul network to another communications subscriber.

12. A method according to claim 11 wherein the other communications subscriber is another power line subscriber who is served by a different base station.

13. A method according to claim 11 wherein the other communications subscriber is a PSTN subscriber.

14. A method according to claim 11 wherein the other communications subscriber is on an internet-protocol (IP) based network.

15. A method according to claim 11 wherein the step of transmitting the data packets over a backhaul network to another communications subscriber includes determining the location of the other subscriber.

16. A communications apparatus for transmitting speech-band signals over a power line communications system comprising a power line for distributing electricity to a plurality of premises and a communication station coupled to the power line, the apparatus comprising:

an interface for receiving speech-band signals from speech-band communications equipment;

means for digitising the speech-band signals;

means for encoding the digitised signals into data packets;

means for transmitting the data packets to/from the station over a part of the line which is external to the premises, using a packet data communications protocol, wherein the data packets have a length of 2–5 ms.

17. A method of establishing a speech-bank call over a power line communications system comprising a power line for distributing electricity to a plurality of premises and a communication station coupled to the power line, the method comprising:

receiving speech-band signals at the communications station from speech-band communications equipment, the speech-band signals comprising speech and signalling;

converting the signalling between an analogue form used by the communications equipment and digital messages which can be conveyed over the power line data packets;

encoding the digital messages into data packets;

transmitting the data packets to/from the station over a part of the line which is external to the premises, using a packet data communications protocol, wherein the data packets have a length of 2–5 ms.

receiving the packets at a base station which is coupled to the power line;

determining destination of the packets;

transmitting the packets over a backhaul network to anther communications station according to the determined destination, and returning signalling information to the communications station.

* * * * *